J. M. MORRIS.
VALVE CONTROLLING MECHANISM.
APPLICATION FILED MAY 3, 1915.

1,200,218.

Patented Oct. 3, 1916.

INVENTOR
Joshua M. Morris
BY
H. H. Simms
his ATTORNEY

UNITED STATES PATENT OFFICE.

JOSHUA M. MORRIS, OF ROCHESTER, NEW YORK.

VALVE-CONTROLLING MECHANISM.

1,200,218.  Specification of Letters Patent.  Patented Oct. 3, 1916.

Application filed May 3, 1915. Serial No. 25,409.

*To all whom it may concern:*

Be it known that I, JOSHUA M. MORRIS, of the city of Rochester, in the county of Monroe and State of New York, have invented a new and useful Valve-Controlling Mechanism, fully set forth in the following specification and shown in the accompanying drawings.

The present invention relates to a valve controlling mechanism designed especially for use in a starting mechanism for internal combustion engines of the type employing compressed air as the motive power, an object of the invention being to provide a structure which will be effective in operation and have ease of action.

To these and other ends, the invention consists in certain parts and combinations of parts all of which will be hereinafter described, the novel features being pointed out in the appended claims.

Figure 1:
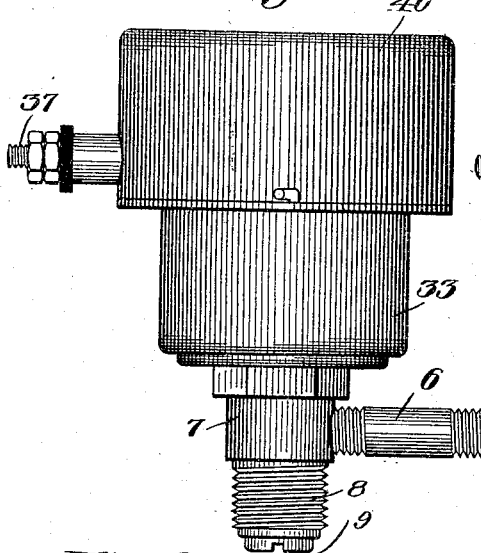
Figure 2:
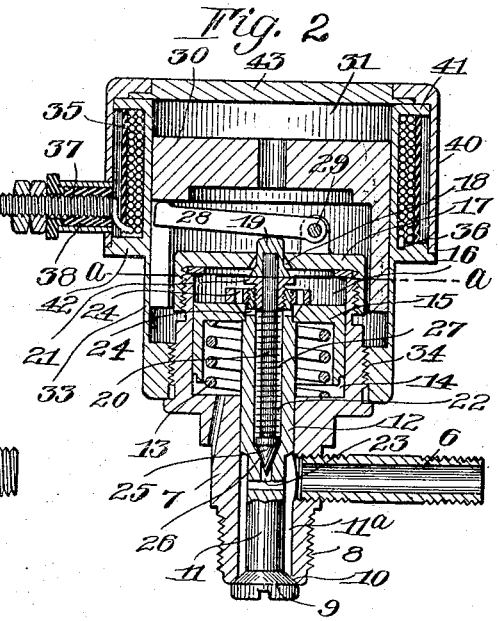
Figure 3:
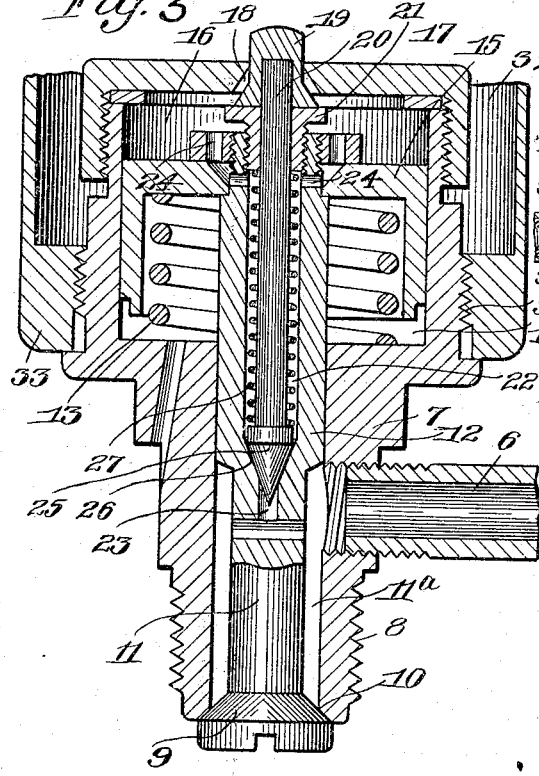
Figure 4:
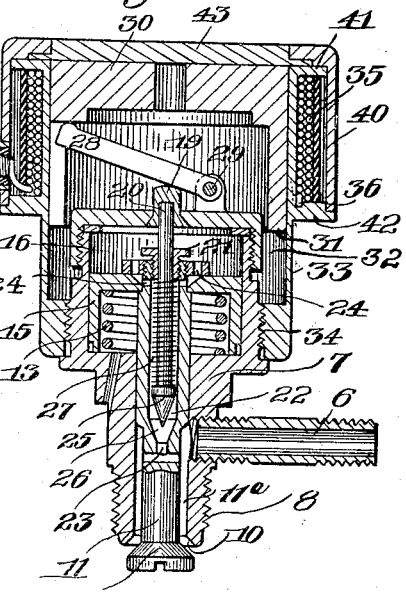

In the drawings: Figure 1 is a side view of one of the valves employed for supplying air to the cylinders; Fig. 2 is a vertical section through the valve showing the latter in closed position; Fig. 3 is an enlarged sectional view of a portion of the view shown in Fig. 4; and Fig. 4 is a sectional view showing the valve in open position.

The valve preferably embodies a casing member 7 formed with a cylindrical bore and externally threaded at 8 near one end, the casing member having the air supply piping 6 connecting with an inlet communicating with the cylindrical bore. The externally-threaded portion is adapted to be fitted within a bore in a cylinder of the engine in order to supply air to said cylinder by way of the piping 6 and the bore or passageway in the casing member 7. The air supply is controlled preferably by a valve member 9 having a tapered portion which coöperates with a tapered seat 10 about the cylindrical bore or passageway.

For operating the valve member, a stem connected thereto operates through the cylindrical bore or passageway of the member 7, this stem having a reduced portion 11 providing a chamber 11ª about the same to establish communication between the piping 6 and the outlet of the casing member 7 into the engine cylinder. The valve stem also has a portion 12 which tightly fits that portion of the cylindrical bore above the inlet piping 6. Normally, the valve member 9 is held to its seat 10 by a helical spring 13.

For moving the valve member away from its seat against the action of the spring 13, a pneumatic device may be employed. This device preferably embodies a cylinder formed by an enlarged bore 14 in the casing member 7 and a cupped piston 15 working air tight within the cylinder and secured to the valve stem. The spring 13 lies within the cylinder below the piston and a cap 17 closes the upper end of the cylinder and provides a chamber 16 above the piston. An exhaust opening 18 is provided in the cap for air in the chamber 16 and this opening may be controlled by a valve 19 which may be arranged on a common stem with a valve 25 which controls the communication between the air supply and the pneumatic device. Preferably this communication is in the form of a central bore 22 in the valve stem and ports 23 and 24 leading from the ends of said bore and communicating respectively with the annular chamber 11ª and chamber 16. A valve seat 26 is formed at one end of the bore 22 for engagement by the valve 25, and bushings 21 close the upper end of the bore and guide the valve stem 20. About the stem, a coil spring 27 may be arranged to give the valve 25 a tendency to move to closed position. This spring, however, is not strong enough to hold the valve member to its seat 26 against the action of the air pressure in the chamber 11ª and, in order to hold the valve 25 to its seat 26 against such air pressure, a controlling lever or member 28 is pivoted to the upper face of the cap 17 at 29 and bears upon the valve member 19 which is arranged on the stem 20. This controlling lever may, in turn, be acted upon by a weighted member 30 provided with a depending flange 31 and operating within a chamber 32 formed by a casing member 33 which has screw threaded engagement with the exterior of the casing member 7 at 34.

To elevate the weighted member 30 at the desired time, said weighted member may be utilized as the core of a solenoid, the other portion of which is formed by a coil 35 surrounding the upper portion of the casing member 33. One terminal 36 of this solenoid is electrically connected with the casing member 33 while the other terminal 37 is insulated at 38 from the casing member. A removable cap 40 may coöperate with flanges 41 and 42 on the casing member 33 to provide a chamber for the coil 35 and an iron disk 43 may close the end of the chamber 32 and be held to the casing member 33 by the cap 40.

From the terminal 37, a conductor 44 leads to one of the contacts on an electrical timer of any suitable construction, this timer being adjustable as usual to vary the time of the impulses with relation to the position of the piston. A conductor leads from the timer to any suitable source of electrical energy and from the latter a conductor connects with the frame of the machine to form the electric circuit.

As the coil is energized, it lifts the core or weight 30 and permits the air in piping 6 to lift the valve 25 from its seat 26, thus admitting air from the chamber 11ª by way of the passageway 23, bore 22, and ports 24 to the chamber 16 of the pneumatic device. The pressure of this air is sufficient to depress the piston 15 against the action of the spring 13 and, in this way, to shift the valve stem 12 to move the valve member 9 away from its seat 10 as shown in Fig. 4, thereby permitting the air from the inlet pipe 6 to pass into the engine cylinder. Almost immediately, the solenoid is deënergized by the timer, thus permitting the weight 32 to depress the lever 28 thus moving the stem 20 against the action of its spring 27 and opening the exhaust outlet 18 of the chamber 16. With the opening of this outlet, air escapes from the chamber 16 to the atmosphere, thus permitting the piston 15 to return to the normal position shown in Fig. 2 under the action of the spring 13 and, at the same time, moving the valve member 9 to the valve seat 10 to cut off the supply of air.

The valves which control the supply of air to the cylinders are preferably held in closed positions by springs and moved to open positions by pneumatic devices which are controlled by electrically operated means.

What I claim as my invention and desire to secure by Letters Patent is:

1. In combination with a casing having an inlet and an outlet, a valve member arranged to control communication between them and to move to open position in the direction of the fluid flow through the valve, a spring acting on said valve member for holding it in closed position, a fluid operated device for acting on the valve member in opposition to the spring, said device having a communication with the inlet side formed in the valve member, a valve controlling such communication and supported by the valve member, said valve moving to open position in the direction opposite from that in which the valve member moves, a spring for maintaining such valve closed, and means for controlling the opening movement of the valve.

2. In combination with a casing having an inlet and an outlet, a valve member arranged to control communication between them and to move to open position in the direction of the fluid flow through the valve, a spring acting on said valve member for holding it in closed position, a fluid operated device for acting on the valve member in opposition to the spring, said device having communication to the inlet side, a pressure-operated valve controlling said communication and opening under pressure of the inlet side, a spring acting to hold the pressure-operated valve closed, and a weight also acting to hold the pressure-operated valve closed, said weight being movable to permit the pressure to open the valve.

3. In combination with a casing having an inlet and an outlet, a valve member arranged to control communication between them, a spring acting on said valve member for holding it in closed position, a fluid-operated device for acting on the valve member in opposition to the spring, said device having communication to the inlet side, a pressure-operated valve controlling said communication and opening under pressure of the inlet side, a spring acting to hold the pressure-operated valve closed, a solenoid core acting on the pressure-operated valve to hold it closed, and a solenoid coil acting on the core to release the pressure-operated valve.

4. In combination with a casing having an inlet and an outlet, a valve member arranged to control communication between them and to move to open position in the direction of the fluid flow through the valve, said valve member having a valve stem provided with a passageway opening on the inlet side of the valve member, a spring acting on said valve member for holding it in closed position, a fluid-operated device acting on the valve member in opposition to the spring, said device having communication with the inlet side through the passageway in the valve stem, a valve mounted in the valve stem and controlling such passageway, said valve moving to open position in the direction opposite from that in which the valve member moves, a spring for maintaining such valve closed, and means for controlling the opening movement of such valve.

5. In combination with a casing having an inlet and an outlet, a valve member arranged to control communication between them and to move to open position in the direction of the fluid flow through the valve, a spring for holding such valve member closed, a fluid-operated device for acting on the valve member in opposition to the spring, said device having communication with the inlet side of the casing, a pressure-operated valve controlling such communication and opening under the pressure of the inlet side, an exhaust valve controlling the escape of fluid from the fluid-operated device, a spring acting to hold the pressure-operated valve closed and the exhaust valve open, and means for controlling the opening movement of the pressure-operated valve.

6. In combination with a casing having an inlet and an outlet, a valve member arranged to control communication between the inlet and the outlet, and said valve member having a valve stem provided with a passageway opening on the inlet side of the valve member, a spring acting on said valve member for holding it in closed position, a fluid operated device for acting on the valve member in opposition to the spring, said device having communication with the inlet side through the passageway in the valve stem, a valve controlling such passageway, an exhaust valve controlling the escape of fluid from the fluid-operated device connected with the pressure operated valve, to move with the latter, a spring acting to hold the pressure-operated valve closed and the exhaust valve open, and means for controlling the opening movement.

7. In combination with a casing having an inlet and an outlet, a valve member arranged to control communication between them, a piston carried by said valve member, a cylinder in which said piston operates, a spring for holding the said valve member closed, means providing communication between the piston cylinder and the inlet of the casing, a valve for controlling such communication, said valve opening by pressure from the inlet side of the casing, a solenoid core acting on said pressure-operated valve to hold it closed, and a solenoid coil acting on the core to control the opening of said pressure-operated valve.

8. In combination with a casing having an inlet and an outlet, a valve member arranged to control communication between them and to move to open position in the direction of the fluid flow through the valve, a piston carried by said valve member, a cylinder in which the piston operates, a spring for holding the valve member closed, means providing communication between the piston cylinder and the inlet of the casing, a valve for controlling such communication, such valve opening by pressure from the inlet side of the casing, an exhaust valve for the cylinder connected to the pressure operated valve to be opened when the latter is closed and vice versa, and means for controlling the movement of the pressure-operated valve and the exhaust valve.

9. In combination with a casing having an inlet and an outlet, a valve member arranged to control communication between the inlet and the outlet, a spring for holding said valve member closed, a fluid operated device having communication with the casing and acting on said valve member in opposition to the spring to open the valve, an inlet and an exhaust valve for said fluid operated device connected together so that one opens as the other closes, the inlet valve opening by pressure thereon from the fluid supply, a solenoid core acting on the inlet valve and the exhaust valve to hold the former closed and the latter open, and a solenoid coil acting to shift the core to release the inlet valve and the exhaust valve to the action of the air pressure.

10. In combination with a casing having an inlet and an outlet, a valve member arranged to control communication between the inlet and the outlet, a piston carried by said valve member, a cylinder in which said piston operates having an exhaust opening, a spring to hold said valve member closed, means providing communication between the piston cylinder and the inlet of the casing, a valve for closing the exhaust of the piston cylinder, a valve for controlling the communication between the piston cylinder and the casing inlet, said valve opening by air pressure thereon from the inlet and being connected with the exhaust valve so that the latter opens as the pressure operated valve closes or vice versa, a solenoid core acting to hold the exhaust valve open and the pressure operated valve closed, and a solenoid coil acting on the core to release the exhaust valve and the pressure operated valve.

11. In combination, a casing member having two cylindrical bores one of which is smaller than the other, said casing member being externally threaded near one end of the small bore and being provided with an inlet communicating with the smaller bore and with a valve seat at one end of the smaller bore, a valve member coöperating with said seat, a stem on the valve member extending through the smaller cylindrical bore and having a reduced portion between the inlet and the valve seat, a piston arranged on the valve stem and operating in the larger bore of the casing member, a spring arranged in the larger bore and acting on the piston to hold the valve member closed, a cap for the larger end of the bore providing a chamber above the piston and having a central exhaust opening, the valve stem having the central bore communicating with the annular chamber about the reduced portion of the valve stem and also with the chamber above the piston, a stem operating in said central bore, two valves carried by said stem, one arranged to close the bore and the other to close the exhaust opening in the cap, the arrangement being such that when one is closed the other is open, a solenoid core acting on said stem to hold the exhaust valve open and the other valve closed, and a solenoid coil for shifting the solenoid core to release the two valves.

12. In combination, a casing member having two cylindrical bores one of which is smaller than the other, said casing member being externally threaded near one end of the small bore and being provided with an inlet communicating with the smaller bore and with a valve seat at one end of the smaller bore, a valve member coöperating with said seat, a stem on the valve member extending through the smaller cylindrical bore and having a reduced portion between the inlet and the valve seat, a piston arranged on the valve stem and operating in the larger bore of the casing member, a spring arranged in the larger bore and acting on the piston to hold the valve member closed, a cap for the larger end of the bore providing a chamber above the piston and having a central exhaust opening, the valve stem having the central bore communicating with the annular chamber about the reduced portion of the valve stem and also with the chamber above the piston, a stem operating in said central bore, two valves carried by said stem, one arranged to close the bore and the other to close the exhaust opening in the cap, the arrangement being such that when one is closed the other is open, and means for controlling said two valves.

JOSHUA M. MORRIS.

Copies of this patent may be obtained for five cents each, by addressing the "Commissioner of Patents, Washington, D. C."